United States Patent [19]
Burns

[11] Patent Number: 5,511,427
[45] Date of Patent: Apr. 30, 1996

[54] CANTILEVERED MICROBEAM TEMPERATURE SENSOR

[75] Inventor: David W. Burns, Minneapolis, Minn.

[73] Assignee: Honeywell Inc., Minneapolis, Minn.

[21] Appl. No.: 94,775

[22] Filed: Jul. 21, 1993

[51] Int. Cl.[6] .................................................. G01L 19/04
[52] U.S. Cl. ................................. 73/708; 73/649; 73/497
[58] Field of Search ....................... 73/862, 497, 517 AV, 73/708, 649

[56] References Cited

U.S. PATENT DOCUMENTS

| | | |
|---|---|---|
| 3,413,573 | 11/1968 | Nathanson et al. . |
| 3,470,400 | 9/1969 | Weisbord . |
| 3,486,383 | 12/1969 | Riordan . |
| 3,657,667 | 4/1972 | Nishikubo et al. . |
| 4,535,638 | 8/1985 | EerNisse et al. ............... 73/862.59 |
| 4,764,244 | 8/1988 | Chitty ................................. 156/630 |
| 4,801,897 | 1/1989 | Flecken . |
| 4,841,775 | 6/1989 | Ikeda et al. ........................... 73/704 |
| 4,901,586 | 2/1990 | Blake et al. . |
| 4,986,670 | 1/1991 | Uchiyama ............................ 374/117 |
| 5,089,695 | 2/1992 | Willson et al. ................ 73/862.59 |
| 5,090,254 | 2/1992 | Guckel et al. . |
| 5,109,853 | 5/1992 | Taicher et al. ..................... 128/653.2 |
| 5,188,983 | 2/1993 | Guckel et al. ................... 73/862.59 |

FOREIGN PATENT DOCUMENTS

| | | |
|---|---|---|
| 0101669A3 | 2/1984 | European Pat. Off. . |
| 0371592A2 | 6/1990 | European Pat. Off. . |

OTHER PUBLICATIONS

"Characteristics of polysilicon resonant microbeams" by J. D. Zook et al., *Sensors and Actuators*, vol. 35, No. 1, Oct., 1992, Lausanne, CH, pp. 51–59.

Abstract—JP patent 04 093 631 A (Nissan Motor Co. Ltd.), *Patent Abstracts of Japan*, vol. 16, No. 319 (P–1385), Jul. 13, 1992.

*Primary Examiner*—Richard Chilcot
*Assistant Examiner*—Max Noori
*Attorney, Agent, or Firm*—John G. Shudy, Jr.

[57] ABSTRACT

Measuring devices employing resonant strain gauges, e.g. pressure transducers or accelerometers, are compensated for variation in temperature by employing a secondary resonant microbeam in combination with the primary microbeam of the strain gauge. The secondary microbeam is mounted in cantilever fashion, with one end of the elongate polysilicon beam fixed to a silicon substrate, while the remainder of the beam is free to oscillate relative to the substrate. An oscillating drive voltage is supplied to a drive electrode mounted on the beam and a substantially uniform electrical field is maintained in the region about the beam. The frequency of oscillation is controlled by a piezo resistor formed on the beam and used for detecting instantaneous beam position relative to the substrate. The cantilevered microbeam is free from the effects of residual or induced strain. Therefore, its natural resonant frequency depends upon temperature, as beam modulus of elasticity and density change with temperature. By contrast, the resonant beam of the strain gauge responds to induced strain and temperature effects. Outputs based on the natural resonant frequencies of the cantilever beam and the strain gauge beam can be combined to provide a strain gauge output compensated for temperature effects.

18 Claims, 4 Drawing Sheets

5,511,427

CANTILEVERED MICROBEAM TEMPERATURE SENSOR

BACKGROUND OF THE INVENTION

The present invention relates to resonant microbeam sensors that utilize induced strain to measure acceleration, pressure and other variables, and more particularly to providing temperature compensation in such transducers.

Resonant transducers are well known for their capacity to achieve high accuracy measurements. Vibrating transducers have been used in precision accelerometers and pressure sensors. These devices operate on the principal that a natural frequency of vibration (i.e. resonant frequency of an oscillating beam or other member) is a function of the induced strain along the member. More particularly, tensile forces elongating the beam increase its resonant frequency, while forces compressing the beam reduce the natural frequency. The frequency output of a resonant gauge or beam is readily converted to digital readings reflecting the measured quantity, requiring only a counter and a reference clock for this purpose. Thus, such transducers are simple and reliable, provide a high degree of discrimination while using a relatively simple interface to digital signal processing circuitry.

One particularly effective transducer of this type is a resonant integrated microbeam sensor, for example as disclosed in U.S. patent application Ser. No. 07/937,068, filed Aug. 31, 1992 entitled "RESONANT GAUGE FOR MICROBEAM DRIVEN IN CONSTANT ELECTRIC FIELD" and assigned to the assignee of this application. The sensor includes a silicon substrate, a polysilicon flexure beam attached at both ends to the substrate, and a polysilicon rigid cover cooperating with the substrate to enclose the flexure beam within a sealed vacuum chamber. A pair of bias electrodes on opposite sides of the beam create a constant electrical field about the flexure beam. A drive electrode on the flexure beam is selectively charged to oscillate the beam. A piezo resistive element on the flexure beam is used to indicate beam position, and also provides feedback to the drive oscillator. Thus, the beam tends to oscillate at its natural resonant frequency.

The sensor can be fabricated on a pressure sensitive diaphragm to be elongated or compressed by deflections of the diaphragm in response to pressure changes. Similarly, the sensor can be fabricated on a flexure of an accelerometer to be elongated or compressed by deflections of the flexure in response to accelerations. While satisfactory in many of these applications, the sensors are subject to error due to deviations in temperature.

It is known to provide temperature compensation in connection with resonant sensors. For example, U.S. Pat. No. 4,535,638 (EerNisse et al) discloses a resonator transducer system in which a vibratory element such as quartz crystal is driven to oscillate at two frequencies, both of which vary with changes in applied force and changes in temperature. The frequency outputs are processed by a computer containing predetermined coefficients for correcting as to the temperature effect.

U.S. Pat. No. 4,765,188 (Krechmery et al) discloses a pressure transducer including a diaphragm with several piezo resistor strain gauges for sensing pressure. A temperature dependent resistor also is formed on the diaphragm. The output of the temperature sensitive resistor is converted to a digital signal provided to a programmable read-only memory (PROM). The PROM stores correction data to provide temperature compensation.

While these approaches are workable, they require storage of compensation data and also frequently require analog-to-digital conversion. This adds to the complexity of sensing and compensation circuitry and thus increases the difficulty of semiconductor device fabrication.

Therefore, it is an object of the present invention to provide a resonant sensing device in which one or more sensors that sense temperature provided for compensation generate digital outputs, eliminating the need for analog-to-digital conversion.

Another object is to provide, in a single measuring device, the combination of a primary resonant sensor and at least one secondary resonant sensor for compensation.

A further object is to provide a measuring device in which a secondary resonant sensor effectively compensates for temperature, even when mounted proximate a primary resonant sensor on the measuring device.

Yet another object of the invention is to provide a temperature compensating resonant sensor that can be formed directly upon a pressure measuring diaphragm or an acceleration measuring flexure, and in each case be virtually unaffected by fluctuations of the diaphragm or flexure due to pressure differentials and strains, respectively.

SUMMARY OF THE INVENTION

To achieve these and other objects, there is provided a temperature responsive sensing device. The device includes a substantially rigid substrate and a vibratory element composed of a semiconductor material. The vibratory element has first and second opposite end regions. The vibratory element is fixed to the substrate along the first end region to support the vibratory element in cantilever fashion for oscillation relative to the substrate at a natural resonant frequency. The natural resonant frequency varies in response to changes in the temperature of the vibratory element. The sensing device further includes a resonant frequency sensing means for sensing the resonant frequency, and for generating an output representing the temperature based on the natural resonant frequency.

Preferably, the vibratory element comprises an elongate beam formed of polycrystalline silicon. The preferred substrate is silicon.

The resonant frequency sensing means can comprise a means for sensing the position of the vibratory element relative to the substrate and generating a periodic position signal indicating the vibratory element's position as it oscillates. An oscillating means is provided for driving the vibratory element in a mechanical oscillation relative to the substrate. The oscillating means receives the position signal and controllably adjusts the frequency of the periodic mechanical oscillation toward coincidence with the natural resonant frequency in response to variations in the position signal frequency. In a particularly preferred arrangement, the oscillating means comprises a drive electrode on the vibratory element, a means for generating a substantially constant electrical field about the vibratory element, and means for applying a periodic drive voltage signal to the drive electrode. Vibratory element position can be detected using a piezoresistor formed on the vibratory element.

The cantilevered vibratory element is advantageously employed for temperature compensation in a measuring device that further includes a primary vibratory element having opposite first and second end portions fixed with respect to the substrate. The primary vibratory element oscillates at a natural resonant frequency that varies with lengthwise extension and contraction, responsive to movement of a flexure region of the substrate that moves in response to variations in a selected condition, e.g. a pressure differential or an acceleration. The preferred primary vibratory element is an elongate beam formed of polycrystalline silicon.

As the primary beam responds to the selected condition, it also responds to changes in temperature. The cantilevered beam likewise responds to changes in temperature. The cantilevered beam may be mounted directly onto or adjacent the substrate flexure region does not experience any elongation or contraction responsive to flexure region movement. Accordingly, the natural resonant frequency of the cantilevered resonant beam is substantially independent of any changes in the primary measured condition.

Because of this characteristic, the cantilevered resonant beam is particularly well suited for temperature compensation of the measuring device. In a preferred temperature compensation arrangement, the primary resonant beam and the cantilevered or secondary resonant beam are driven at their respective resonant frequencies by associated drive electrodes operating in a constant electrical field. Associated oscillators provide the respective periodic drive voltage signals. The oscillator in each case responds to a position signal generated by circuitry including a piezoresistor formed on the respective resonant beam.

The measuring device further includes signal processing means for receiving the resonant frequency outputs of the primary resonant beam and a cantilevered resonant beam, and for compensating the primary resonant beam output by combining it with the cantilevered resonant beam output in a manner to extract the portion of the frequency dependent on fluctuations in temperature. The result is a primary resonant frequency output dependent only upon the primary measured parameter.

A salient feature of the present invention resides in cantilevered support of the secondary resonant beam. Because of the cantilevered support the secondary beam can be positioned on or adjacent the flexure portion of the substrate, yet remain unaffected by flexing or movement of the flexure region. Accordingly, the secondary resonant beam need not be positioned remotely of the primary resonant beam, e.g. on a rigid rim of the substrate, to effectively compensate for temperature variations. In fact, because it can be positioned proximate the primary resonant beam, the cantilevered secondary resonant beam can more effectively compensate for temperature changes occurring about the primary resonant beam. Thus, in accordance with the present invention there is provided a simple and reliable means for measuring accelerations or differential pressure, compensated for temperature effects.

IN THE DRAWINGS

For a further understanding of the above and other features and advantages, reference is made to the following detailed description and to the drawings, in which.

Figure 6:
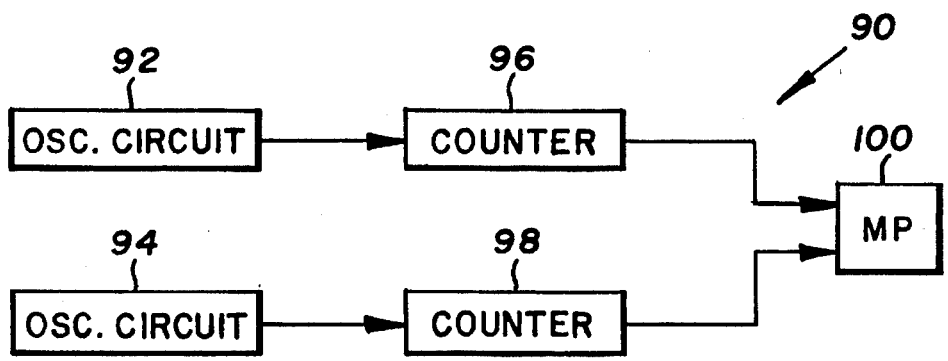
Figure 7:
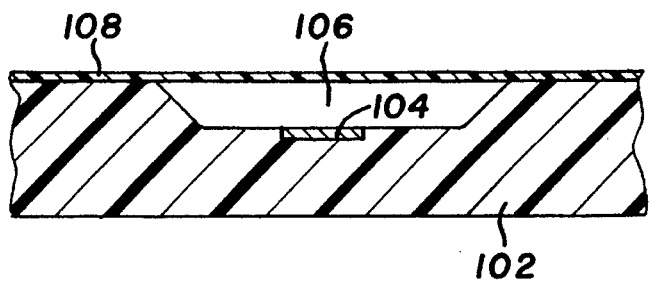
Figure 11:
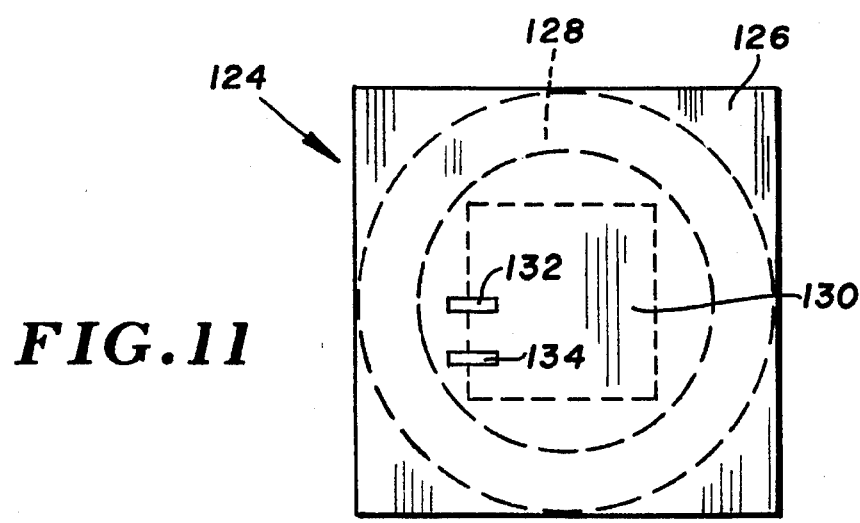
Figure 12:
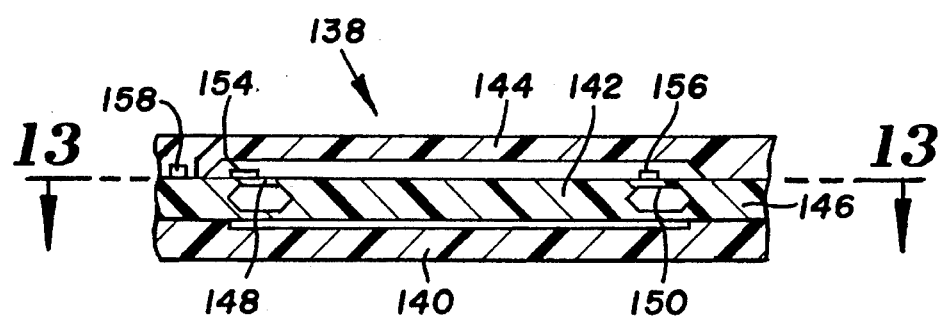
Figure 13:
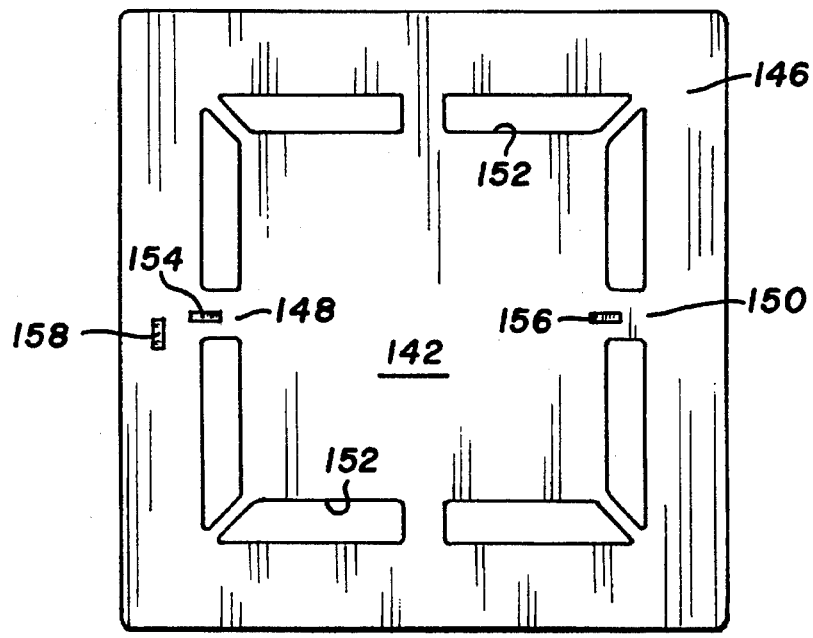

FIGS. 6 schematically illustrates a signal processing system for the pressure sensing device;

FIGS. 7–10 schematically illustrate fabrication of the resonant gauge;

FIG. 11 is a top plan view of an alternative pressure sensing device constructed according to the present invention;

FIG. 12 is a top plan view of an accelerometer fabricated according to the present invention; and FIG. 13 is a sectional view taken along the line 13—13 in FIG. 12.

DETAILED DESCRIPTION OF THE PREFERRED EMBODIMENT

Figure 1:
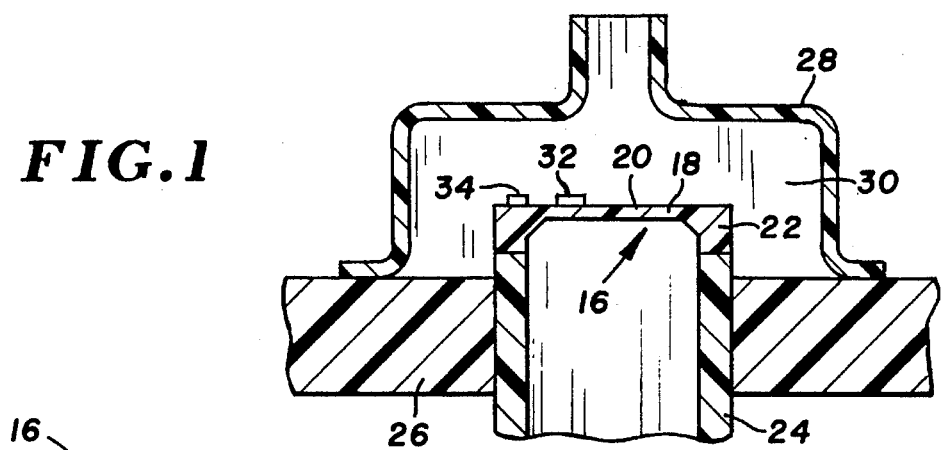
FIG. 1 is an elevational view in section of a pressure sensing device constructed in accordance with the present invention.
Figure 2:
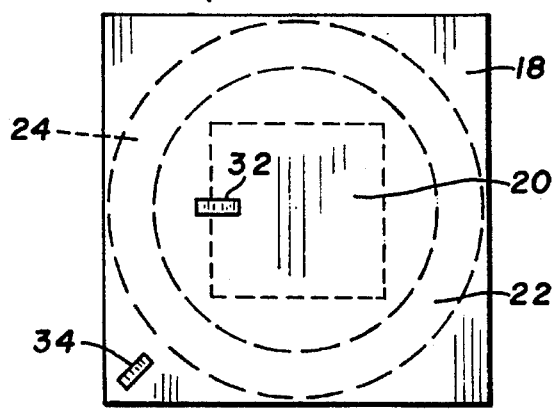
FIG. 2 is a top plan view of the pressure sensing device.

Turning now to the drawings, there is shown in FIGS. 1 and 2 a pressure sensing device 16. The device includes a silicon substrate or base 18 including a substantially square diaphragm 20, surrounded by a substantially rigid peripheral region or rim 22. Diaphragm 20 can be fabricated with sides of a length typically in the range of about 4–150 mils. The diaphragm is thin and flexible, for example with a thickness in the range of about 10–100 micrometers. While illustrated as square, diaphragm 20 can be formed with other shapes, e.g. circular or rectangular if desired. Anisotropic etching is employed to form rectangular or square diaphragms, while isotropic etching is employed to form circular diaphragms. The bottom of peripheral rim 22 is thermoelectrically bonded to a tube of Pyrex (brand) glass. Other materials suitable for the tube include ceramics, mullites, certain plastics, and silicon. Tube 24 is held within a rigid supporting structure indicated at 26. A cover 28 is fastened to the supporting structure and cooperates with this structure to define a chamber 30. Thus, sensing device 16 is positioned at the interface of chamber 30 and the interior of tube 24.

A pressure responsive resonant strain gauge 32 is fabricated on the top of diaphragm 20 near peripheral region 22. Resonant gauge 32 includes an elongate beam formed of fine grain, low residual tensile strain polysilicon (polycrystalline silicon). The beam has a length in the range of 50–1000 micrometers, and more preferably about 200 micrometers, a thickness of about 1–3 micrometers and a width in the range of 20–80 micrometers. Opposite ends of the beam are fixed on substrate 18 (more particularly on the diaphragm). A substantially rigid shell or cover encloses the beam. Thus, a central or medial region of the beam is free to oscillate within a chamber formed by the shell and the substrate. For a more detailed description of resonant gauge such as resonant gauge 32, reference is made to the aforementioned U.S. patent application Ser. No. 07/937,068.

Figure 3:
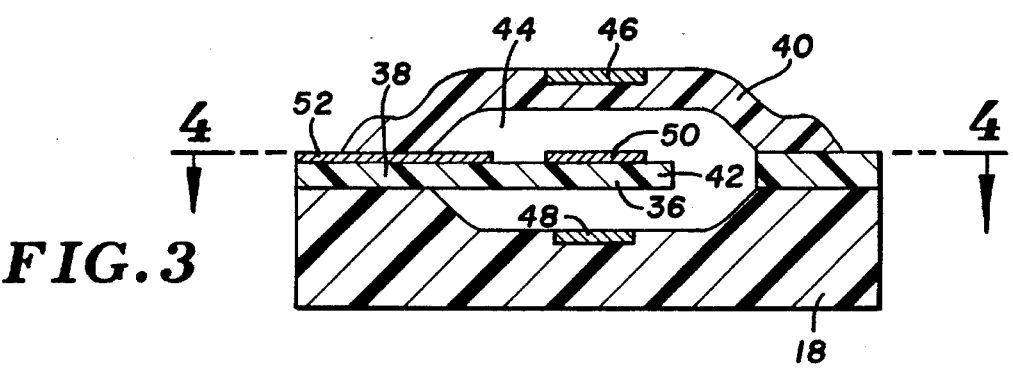
FIG. 3 is an enlarged sectional view taken along the line 3—3 in FIG. 2 showing a resonant gauge of the device.

A temperature sensor 34 also is fabricated on substrate 18, along rim 22. As seen in FIG. 3, temperature sensor 34 includes an elongate beam 36 formed of fine grain, low tensile strain polysilicon. The length of beam 36 can be in the range of 50–1000 micrometers. Its thickness is in the range of 1–3 micrometers and its width is in the range of 20–80 micrometers. One particularly preferred beam is about 100 micrometers long by 46 micrometers wide by 2 micrometers thick. Beam 36 is not supported at both ends. Rather, only one end of the beam, indicated at 38, is fixed to substrate 18. Beam 36 thus extends in cantilever fashion horizontally as viewed in FIG. 3, supported between the substrate and a substantially rigid shell or cover 40, which also is formed of polysilicon. Thus the beam has a free end 42, and is free to oscillate within a chamber 44 formed by the shell and the substrate.

An upper bias electrode 46 is formed (e.g. by ion implantation) into a portion of cover 40. A similar lower bias electrode 48 is formed into the surface of substrate 18 along the bottom of chamber 44. A drive electrode 50 is formed along a portion of the top surface of cantilever beam 36. A piezoresistor 52 is formed along the top surface of the beam and is co-planar with drive electrode 50, spaced apart from and thereby electrically isolated from the drive electrode. Bias electrodes 46 and 48 are spaced apart from drive electrode 50 transversely with respect to the length or longitudinal dimension of beam 36. The drive electrode and piezoresistor are approximately transversely centered between the bias electrodes.

Figure 4:
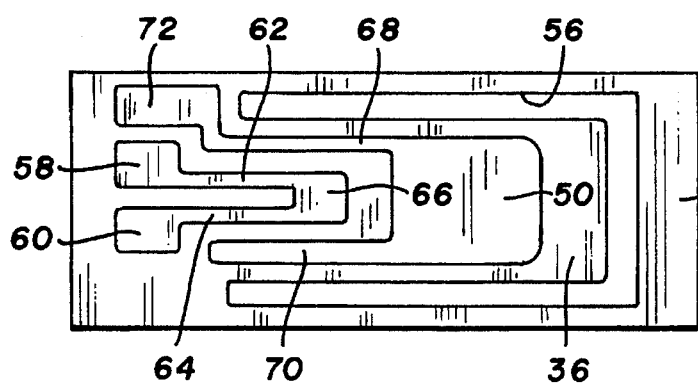
FIG. 4 is a sectional view taken along the line 4—4 in FIG. 3.

As seen in FIG. 4, beam 36 is formed as part of a larger polysilicon thin film 54. A gap or slot 56, runs along three sides of beam 36. Drive electrode 50 is formed along a portion of the top surface of beam 36. Piezoresistor 52 also is formed along the top surface of the beam. The piezoresistor includes contact regions 58 and 60, a pair of legs 62 and 64, and a bridge 66 coupling the legs. Bridge 66 can be enlarged for voltage level control, if desired. Drive electrode 50 is substantially rectangular, although the shape is not critical. Two narrow extensions 68 and 70 extend from the electrode. One of the extensions is coupled to a contact region 72.

Pressure sensing device 16 measures a pressure differential (i.e. the difference between pressures $P_1$ and $P_2$ on opposite sides of diaphragm 20), based on the frequency at which the beam of resonant strain gauge 32 oscillates. More particularly, when diaphragm 20 flexes in response to a difference in pressures $P_1$ and $P_2$, it produces axial or longitudinal stress upon the resonant gauge beam, altering the strain along the beam. Downward diaphragm flexure tends to elongate the beam and increase its natural resonant frequency. Conversely, upward diaphragm deflection tends to allow beam contraction or compress the beam, to reduce its natural resonant frequency. Thus, changes in strain along the length of the beam, in response to longitudinally applied external forces, alter the natural resonant frequency of the beam.

While changes in differential pressure account for most of the changes in beam strain, the beam also is influenced by changes in temperature, which alter the density and elastic modulus of the beam. Accordingly, temperature sensor 34 is provided for temperature compensation, to eliminate or minimize errors in readings of natural resonant frequency caused by changes in temperature. Cantilever beam 36 is sensitive to temperature changes and like the beam in resonant strain gauge 32, undergoes changes in density and modulus of elasticity. In other words, beam 36 responds to changes in temperature in much the same manner as the beam of the resonant strain gauge. At the same time, because beam 36 is cantilevered, it remains completely isolated from applied strain, and thus is virtually independent of differential pressure and static pressure effects.

To maintain the required oscillation of beam 36, a periodically oscillating voltage level is provided to drive electrode 50, while a substantially uniform constant electrical field is maintained in the region about the beam. Piezoresistor 52 functions as a means for detecting the instantaneous position of beam 36 relative to the substrate and to cover 40, by generating a detector voltage or current that varies with the beam position.

Figure 5:
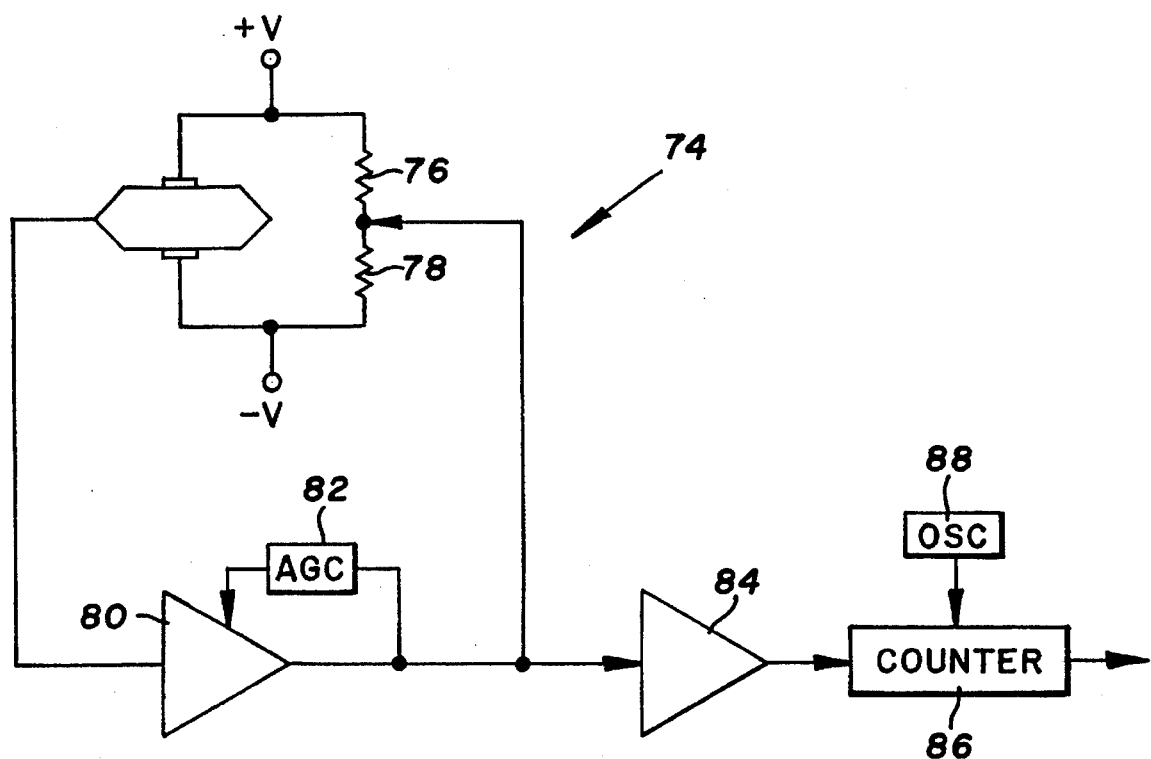
FIG. 5 is a schematic view of the resonant gauge and an associated oscillator circuit of the device.

The detector voltage or current is provided as an input to an oscillator circuit 74, the output of which is the periodic drive voltage signal. The drive voltage signal is provided to drive electrode 50, to maintain beam 36 in steady state oscillation at its natural resonant frequency. For a polysilicon beam of the microscopic size described, the resonant frequency tends to be in the range of about 100–500 kilohertz. The oscillator circuit, shown schematically in FIG. 5, provides a closed loop for continually adjusting the frequency of the drive signal toward coincidence with the natural resonant frequency of beam 36.

Bias electrodes 46 and 48 are preferably biased at levels +V and −V, respectively, to generate a uniform and constant electric field in the region about beam 36, and more particularly about drive electrode 50. Resistances 76 and 78 are approximately equal in value, to bias the drive electrode at ground. As beam 36 mechanically oscillates, piezoresistor 52 provides the detector signal as input to an amplified 80. The detector signal is a voltage that oscillates at the same frequency as the frequency of beam oscillation. An automatic gain control circuit 82 provides feedback to amplifier 80, to prevent distortion at the oscillation frequency. The drive voltage signal provided to drive electrode 50 is based upon the output of amplifier 80. The oscillator circuit includes diodes (not shown) to clamp the signal amplitude, thus to limit beam oscillation to within the linear response range. Other means of amplitude control known in the art can be used to maintain the drive amplitude.

As the beam begins to oscillate at a different frequency in response to a change in temperature, the different frequency is sensed in piezoresistor 52, and the detector signal is provided to amplifier 80 at the new frequency. The output of amplifier 80 controls the frequency of the drive voltage signal. Thus, the drive voltage signal frequency is continually and controllably adjusted toward coincidence with the natural resonant frequency of the beam. Of course, changes in the strain across the strain gauge beam likewise alter the natural resonant frequency of that beam, with a similar corresponding adjustment in its associated oscillator circuit.

The output of amplifier 80 is provided to an output buffer amplifier 86. The output of the buffer amplifier is provided to a digital counter 86 controlled by a clock oscillator 88. The operative counter 86 is provided to digital circuitry (not shown) for a direct, real-time reading of the temperature. Another, substantially similar oscillator circuit is provided to maintain the resonant strain gauge beam in steady state oscillation at or near its natural resonant frequency. For a more detailed explanation of this circuit, reference is made to the aforementioned U.S. application Ser. No. 07/937,068 incorporated by reference herein.

As used in device 16, the utility of temperature sensor 34 resides in its sensitivity to temperature changes, in combination with its independence from changes in pressure differential. The natural resonant frequency of the strain gauge beam is influenced by temperature and induced strain from the flexing of diaphragm 20, while the natural resonant frequency of temperature sensor 34 is effected only by temperature. The detector voltages relating to each of these natural resonant frequencies can be provided to a counter, with the respective counter outputs processed to determine a compensated differential pressure, virtually free of any error due to temperature effects. The result is substantially improved accuracy in differential pressure measurement.

FIG. 6 schematically illustrates a signal processing system 90 for generating an output that accurately depicts differential pressure compensated for difference in temperature. The system includes two oscillator circuits 92 and 94. The oscillator circuits generate voltage outputs representing the respective natural resonant frequencies of resonant strain gauge such as 32 which can be considered the primary sensing device measuring the primary variable, and temperature sensing device-device-like device 34 which measures the secondary variable, i.e. temperature.

Digital counters at 96 and 98 receive the respective oscillator circuit outputs, generate respective counts and provide the respective counts to a microprocessor 100. Other well known means for determining the natural resonant frequencies can be employed. Within the microprocessor, the counts associated with the resonant strain gauge and the temperature sensor are processed according to parameters pre-stored in the microprocessor, e.g. in a programmable read-only memory (PROM), in a known manner. Accordingly, microprocessor 100 provides as its output a precise reading of differential pressure, virtually unaffected by changes in temperature. More particularly, the resonant frequency of the cantilevered microbeam in the temperature sensor can be calculated using the following equation:

$$f=(B^2h/2\pi L^2)(E/12\rho)^{1/2}$$

where f is the natural resonant frequency; h is the beam thickness; L is the beam length; B is a dimensionless constant equal to 1.875104 for a cantilevered polysilicon beam in the first mode of vibration; E is the beam modulus of elasticity; and rho ($\rho$) is the density. Thus, frequency under this equation can be characterized as based on a multiplication of two factors, one depending only upon the beam geometry and material, and the other ($E/12\rho$) that depends on temperature. Internal and applied strain are not part of the equation since the cantilevered microbeam is not subject to strain.

By contrast, resonant frequency of the beam in resonant gauge 32 is calculated according to the following equation:

$$f^2=[42Eh^2/\rho L^4][1+(2L^2/7h^2)(\epsilon+\epsilon o)]$$

Where h, L, E and rho ($\rho$) are as explained above; epsilon ($\epsilon$) is the strain caused by the diaphragm deflection due to differential pressure; and $\epsilon_0$ is the internal strain.

FIGS. 7–10 diagrammatically illustrate fabrication of a temperature sensor such as sensor 34. The temperature sensor can be fabricated utilizing low pressure chemical vapor deposition (LPCVD) processes, with equipment known and available in the semiconductor arts. The process begins with a silicon wafer 102 from which multiple temperature sensing devices are fabricated. The wafer preferably is a p-type silicon with an n-type epilayer typically from about 10 to about 100 micrometers thick.

Figure 8:
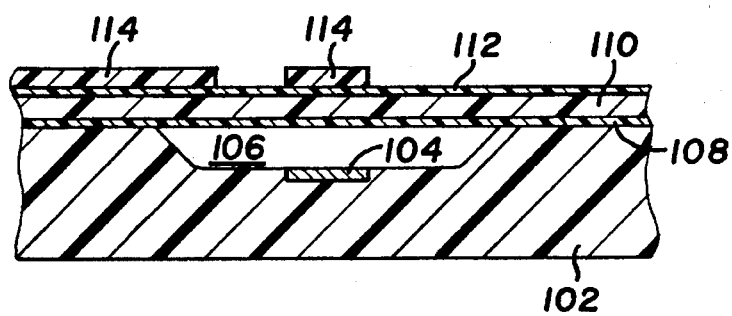

The first step involves local ion implantation of boron to form a p-type lower electrode 104 in the n-type epilayer. Alternatively, an n-type ion implant can be used into p-type material. The second step is to form a lower sacrificial oxide layer 106 in the substrate by local oxidation. A patterned layer of thin oxide and thin nitride is used to perform the local oxidation. The oxide and nitride layers are patterned and etched to form the etch channels and a dielectric layer 108. Next, polysilicon is deposited over dielectric layer 108 to form a resonant beam layer 110, on the order of two microns thick. Silicon nitride is deposited onto the beam layer to a thickness of about 800 angstroms, to provide a dielectric layer 112. Polysilicon is then deposited onto dielectric layer 112 to form a semiconductor layer 114 having a thickness of about 4400 angstroms. Semiconductor layer 114 is doped with boron or phosphorous to considerably enhance its electrical conductivity. A drive electrode, piezoresistor and their associated conductive paths are patterned onto semiconductor layer 114. The layer then is selectively etched removing all doped polysilicon except for the aforementioned circuit components. The result of these process steps is shown in FIG. 8.

Further silicon nitride is deposited at a thickness of about 800 angstroms to provide a dielectrical layer 116. Dielectric layers 112 and 116 cooperate to dielectrically encapsulate the circuit components. Finally, further polysilicon (undoped) is applied over dielectric layer 116 forming a passivation layer 118 in the range of 400–2000 angstroms thick. The passivation layer protects the underlying silicon nitride layer during a subsequent etching to remove sacrificial layers.

Figure 9:
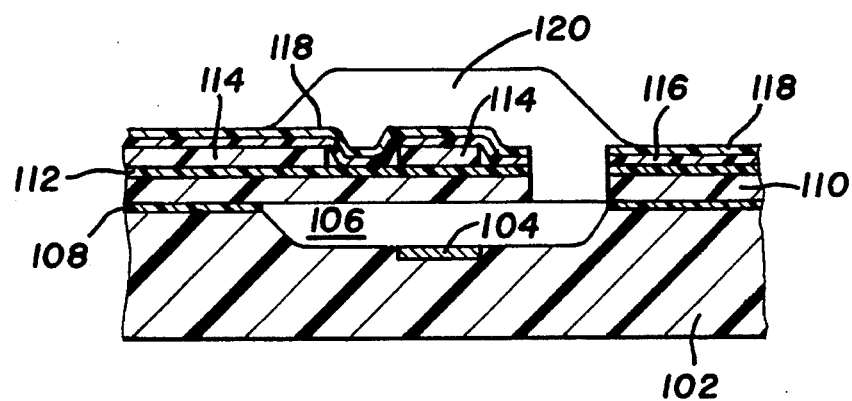
Figure 10:
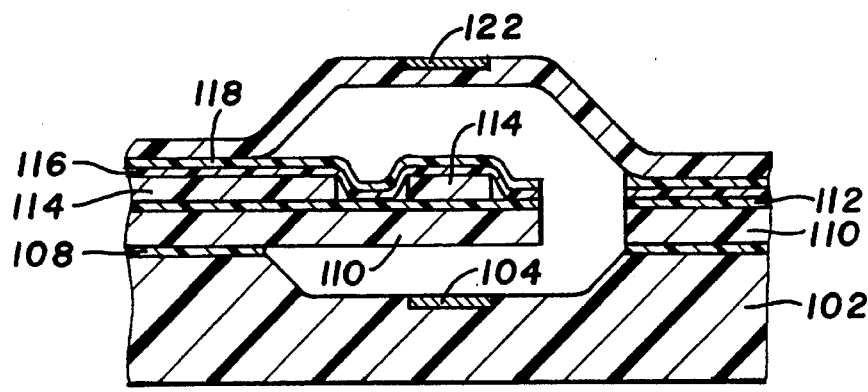

Next, the cantilever beam is patterned. All layers above the substrate and sacrificial layer 106 are selectively etched to define the size and shape of the cantilever beam. Then, a low temperature oxide is deposited as a sacrificial layer 120, patterned to define an upper cavity and etched to provide the upper cavity volume. The result is seen in FIG. 9.

After defining the upper cavity, a cover layer of polysilicon is deposited onto sacrificial layer 120, implanted and annealed to form an upper bias electrode 122. The cover layer is selectively etched to provide the final shape of the cover. After cover fabrication, the sacrificial layers 106 and 120 are removed by an HF etching process to form a chamber.

A vacuum is formed within the chamber by slightly oxidizing exposed surface areas and sealing with a layer of LPCVD polysilicon. The resulting deposition of polysilicon seals the etch channels. Some residue silane gas remains trapped in the chamber, and polysilicon growth continues until the gas is depleted. Finally, electrical contact areas are defined and the oxide is etched from these areas. A metalization layer, e.g. aluminum, is deposited, patterned and selectively etched to provide contact pads. This is followed by an allowing step to complete the fabrication process.

A salient advantage of the cantilevered beam is that temperature sensor 34 can provide the desired temperature compensation regardless of its location on substrate 18. By contrast, a temperature compensating microbeam supported at both ends would be subject to strain, and would require positioning in an area remote from the flexible diaphragm of pressure sensing device 16. This advantage is apparent from FIG. 11, illustrating an alternative pressure sensing device 124 having a substrate 126 thermoelectrically bonded to a tube as indicated in broken lines at 128. Further broken lines at 130 indicate a square diaphragm substantially centered within the substrate. A resonant strain gauge 132 is mounted along a peripheral edge of diaphragm 130. A temperature sensing device 134 is formed onto the diaphragm proximate strain gauge 132.

Temperature sensing device 134, like temperature sensor 34, employs a cantilevered diaphragm formed of fine grain, low tensile strain polysilicon. Because the microbeam is supported only at one end, the remainder of the beam is free to oscillate relative to the substrate and not subject to residual or induced strain. As previously noted, the cantilever beam is sensitive to temperature changes due to changes in the density and modulus of elasticity of the polysilicon forming the beam. Thus, the beam responds to changes in temperature in much the same manner as the resonant beam 36 of strain gauge 34. At the same time, the cantilever beam remains completely isolated from changes in strain due to flexure of the diaphragm. Accordingly, temperature sensing device 134 can be placed adjacent resonant strain gauge 132, virtually eliminating the chance that temperature fluctuations local to the strain gauge might not be sensed by device 134.

FIGS. 12 and 13 show an accelerometer 138 fabricated of semiconductor material; more particularly a first substrate 140 formed of silicon, a second substrate layer providing a proof mass 142, and a third substrate providing a capping layer 144. These layers cooperate to provide a relatively rigid peripheral rim 146. As best seen in FIG. 13, proof mass 142 is supported relative to peripheral rim 146 by a plurality of narrow flexures or bridges, two of which are indicated at 148 and 150. Between each pair of adjacent bridges, a gap separates the proof mass from the periphery. Several of these gaps are indicated at 152.

Accelerometer 138 includes two resonant strain gauges 154 and 156, one fabricated onto the proof mass layer at each of flexures 148 and 150. Each resonant gauge includes a polysilicon resonant microbeam. Each such microbeam, being supported at both ends, is subject to induced strain due to flexure of its associated bridge during accelerations and decelerations.

Resonant strain gauges 154 and 156 are selectively positioned for a cumulative effect. More particularly, strain gauge 154 is mounted toward an outward or peripheral edge region of its associated flexure 148. By contrast, strain gauge 156 is mounted proximate an inward edge region of flexure 150. As a result, an acceleration induces compressive strain on one of the resonant gauges while simultaneously inducing tensile strain upon the other gauge. For example, given an acceleration in the upward direction as viewed in FIG. 12, proof mass 142 tends to lag, i.e. be displaced downwardly relative to cover 144 and substrate 140. Such movement tends to elongate bridge 148 near strain gauge 154 while tending to shorten bridge 150 in the region of strain gauge 156. The respective resonant frequency signal outputs of strain gauges 154 and 156 are subtracted, resulting in a representative output at about twice the signal amplitude of each resonant gauge considered alone, for enhanced accuracy. An added benefit is that first order non-linear effects, a source of possible error particularly at low accelerations, substantially cancel one another.

For temperature compensation a temperature sensing device 158 is fabricated onto the accelerometer along peripheral region 146. Temperature sensor 158 has a polysilicon cantilevered microbeam and accordingly functions in much the same manner as the previously discussed cantilevered microbeams. It is to be appreciated that while the associated oscillator circuits and signal processing circuits are not illustrated, the accelerometer incorporates use of such circuits as described above in connection with the resonant gauges and temperature sensor.

Thus, in accordance with the present invention, a temperature sensor includes a resonant microbeam mounted in cantilever fashion. So mounted, the microbeam is free of residual or induced strain that might arise from movement of immediately surrounding semiconductor material. As a result, the temperature sensors are particularly well suited for mounting near resonant strain gauges with microbeams supported at two opposite ends with the specific intent that they undergo changes in induced strain. The frequency outputs of the resonant strain gauge and the temperature sensor can be combined to compensate for temperature. This provides a natural resonant frequency output representative of induced strain rather than such strain combined with temperature effects. The cantilevered microbeam insures accurate temperature compensation, even when the temperature sensor is located near a diaphragm or other flexure.

What is claimed is:

1. A sensing device comprising:

a substantially rigid substrate;

a vibratory element composed of a semiconductor material and having first and second opposite end regions, fixed to the substrate along said first end region to support the vibratory element in cantilever fashion for oscillation relative to the substrate at a natural resonant frequency that varies in response to changes in the temperature of the vibratory element;

an oscillating means for driving the vibratory element in a mechanical oscillation relative to the substrate; and, a resonant frequency sensing means for sensing the resonant frequency and for generating an output representing the temperature, based on said natural resonant frequency; and wherein:

the resonant frequency sensing means comprises a position sensing means for sensing the position of the vibratory element relative to the substrate, and generating a periodic position signal indicating the position of the vibratory element as it oscillates; and the oscillating means for driving the vibratory element in a mechanical oscillation relative to the substrate further comprises the oscillating means receiving the position signal and controllably adjusting the frequency of the periodic mechanical oscillation in response to variations in the position signal frequency, toward coincidence with said natural resonant frequency.

2. The sensing device of claim 1 wherein:

the substrate is formed of silicon.

3. The sensing device of claim 2 wherein:

the vibratory element comprises an elongate beam, and the semiconductor material consists essentially of a polycrystalline silicon.

4. The sensing device of claim 3 wherein:

said oscillating means comprises a drive electrode formed on the vibratory element, a means for generating a substantially constant electrical field in the region of the vibratory element, and a means for applying a periodic drive voltage signal to the drive electrode.

5. The sensing device of claim 4 wherein:

the position sensing means comprises a piezoresistor formed on the vibratory element.

6. The sensing device of claim 4 wherein:

said means for sensing the resonant frequency comprises a signal processing means operatively coupled to the oscillating means, for generating an output based upon the position signal frequency and wherein said means for sensing the resonant frequency, said drive electrode, said means for generating a substantially constant electrical field, and said means for applying a periodic drive voltage signal to the drive electrode are coupled together to operate in a closed loop configuration.

7. The sensing device of claim 6 wherein:

the signal processing means includes a frequency measurement means for generating a frequency output based on the drive voltage signal applied to the drive electrode, and a microprocessor receiving the frequency output.

8. A temperature compensated sensing device including:

a semiconductor substrate;

an elongate primary vibratory element having opposite first and second end portions fixed with respect to the substrate to oscillate at a primary natural resonant frequency that varies with changes in temperature and with changes in a strain present in said semiconductor substrate;

an elongate secondary vibratory element formed of a semiconductor material and fixed to the semiconductor substrate in cantilever fashion to oscillate at a secondary natural resonant frequency and said second vibratory element is solely responsive to changes in temperature of the semiconductor substrate, while substantially unaffected by variations in the strain present in said semiconductor substrate; and a means for sensing the primary and secondary resonant frequencies and for generating a temperature compensated output representing the strain present in said semiconductor substrate according to the primary resonant frequency which is compensated for the effect of temperature based on the secondary natural resonant frequency.

9. The device of claim 8 wherein:

said substrate includes a flexure region that flexes in response to variations in the strain present in said semiconductor substrate, and the primary vibratory element has opposite first and second end portions fixed with respect to the substrate to position the primary vibratory element along the flexure region, for lengthwise extension and contraction of the primary vibratory element responsive to the flexing of the flexure region, said extension and contraction varying the primary natural resonant frequency.

10. The device of claim 9 wherein:

the primary and secondary vibratory elements comprise elongate beams of polycrystalline silicon and the secondary vibratory element is disposed proximate the secondary vibratory element.

11. The device of claim 9 wherein the primary vibratory element is disposed on a deflectable diaphragm so that said deflectable diaphragm responds to a pressure difference between respective first and second pressures on opposite sides of the deflectable diaphragm.

12. A temperature compensated sensing device comprising:

a semiconductor substrate;

an elongate primary vibratory element having opposite first and second end portions fixed with respect to the substrate to oscillate at a primary natural resonant frequency that varies with changes in temperature and with changes in a strain present in said semiconductor substrate;

an elongate secondary vibratory element formed of a semiconductor material and fixed to the semiconductor substrate in cantilever fashion to oscillate at a secondary natural resonant frequency and said second vibratory element is solely responsive to changes in temperature of the semiconductor substrate, while substantially unaffected by variations in the strain present in said semiconductor substrate; and a means for sensing the primary and secondary resonant frequencies and for generating an output representing the strain present in said semiconductor substrate compensated for the effect of temperature, based on the primary and secondary natural resonant frequencies of said primary and secondary vibratory elements; and wherein:

said substrate includes a flexure region that flexes in response to variations in the strain present in said semiconductor substrate;

the primary vibratory element has opposite first and second end portions fixed with respect to the substrate to position the primary vibratory element along the flexure region, for lengthwise extension and contraction of the primary vibratory element responsive to the flexing of the flexure region, said extension and contraction varying the primary natural resonant frequency;

the primary and secondary vibratory elements comprise elongate beams of polycrystalline silicon and the secondary vibratory element is disposed proximate the secondary vibratory element; and the primary vibratory element is disposed on a deflectable diaphragm so that said deflectable diaphragm responds to a pressure difference between respective first and second pressures on opposite sides of the deflectable diaphragm.

13. The device of claim 12 wherein said means for sensing the primary and secondary resonant frequencies includes:

a primary position sensing means for sensing the position of the primary vibratory element relative to the substrate and generating a primary position signal indicating the position of the primary vibratory element as it oscillates;

a primary oscillating means for driving the primary vibratory element in a periodic mechanical oscillation relative to the substrate, said primary oscillating means receiving the primary position signal and controllably adjusting the frequency of the periodic mechanical isolation in response to variations in the primary position signal frequency, toward coincidence with the primary natural resonant frequency;

a secondary position sensing means for sensing the position of the secondary vibratory element relative to the substrate, and generating a periodic secondary position signal indicating the position of the secondary vibratory element as it oscillates; and a secondary oscillating means for driving the secondary vibratory element in a mechanical oscillation relative to the substrate, the secondary oscillating means receiving the secondary position signal and controllably adjusting the frequency of the periodic mechanical oscillation in response to variations in the secondary position signal frequency, toward coincidence with the secondary natural resonant frequency.

14. The device of claim 13 wherein:

each of the primary and secondary oscillating means comprises a drive electrode formed on the associated vibratory element, a means for generating a substantially constant electrical field in the region of the associated vibratory element and a means for applying a periodic drive voltage signal to the associated drive electrode.

15. The device of claim 14 wherein:

the primary and secondary position sensing means comprise piezoresistors formed respectively on the primary and secondary vibratory elements.

16. The device of claim 14 wherein:

said means for sensing the primary and secondary resonant frequencies comprises a signal processing means operatively coupled to the primary and secondary oscillating means, for generating an output based upon the primary and secondary position signal frequencies.

17. The device of claim 16 wherein:

the signal processing means includes a first frequency measurement means for generating a first output based on the drive voltage signal applied to the drive electrode of the primary vibratory element, a second frequency measurement means for generating a second output based on the drive voltage signal applied to the drive electrode of the secondary vibratory element, and a microprocessor receiving the first and second outputs.

18. The device of claim 13, further comprising:

a first amplitude control means electrically coupled to the primary oscillating means and a second amplitude control means coupled to the second oscillating means, wherein both the first and second amplitude control means operate for the purpose of controlling the magnitude of the oscillations of the respective primary and secondary vibratory elements so that a linear operating range of said first and second vibratory members is not exceeded.

\* \* \* \* \*